(No Model.) 5 Sheets—Sheet 1.
F. FRIEDRICHS & A. BREDE.
MACHINE FOR FORMING BACKS OF BOOKS.
No. 507,115. Patented Oct. 24, 1893.
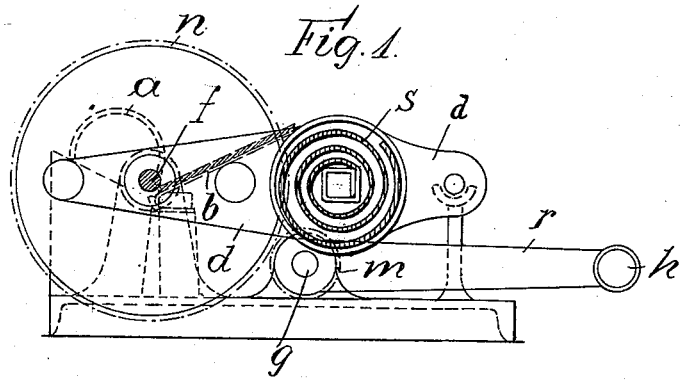
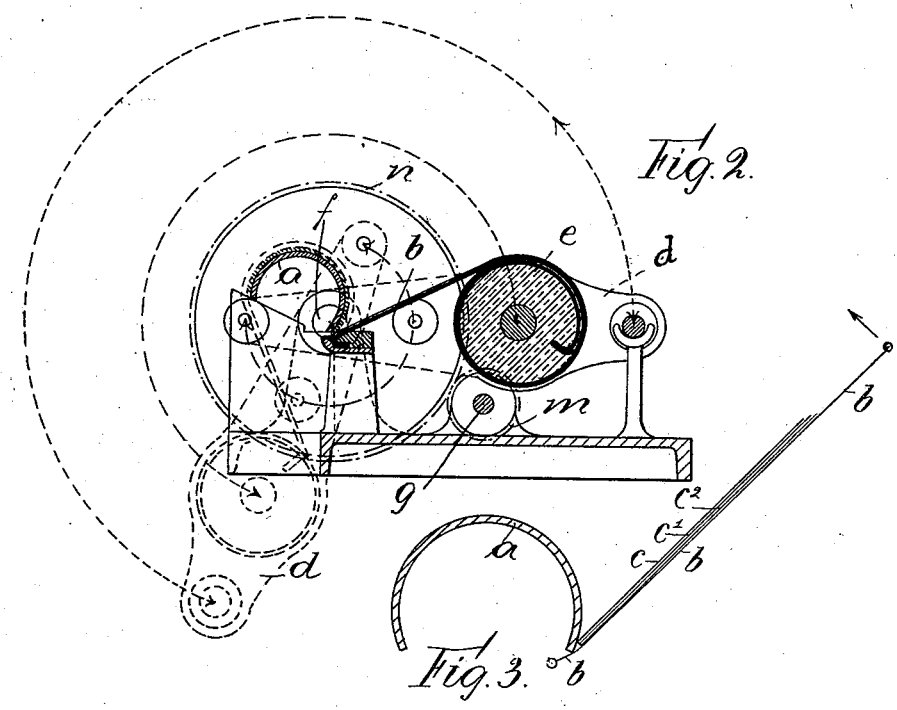
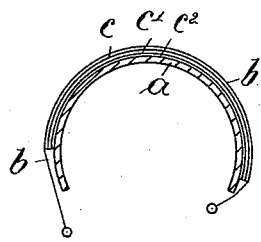
Witnesses:
E. Kayser
Willy Huth
Inventors
Franz Friedrichs
Alexander Brede
by
Robert Dunler
Attorney.

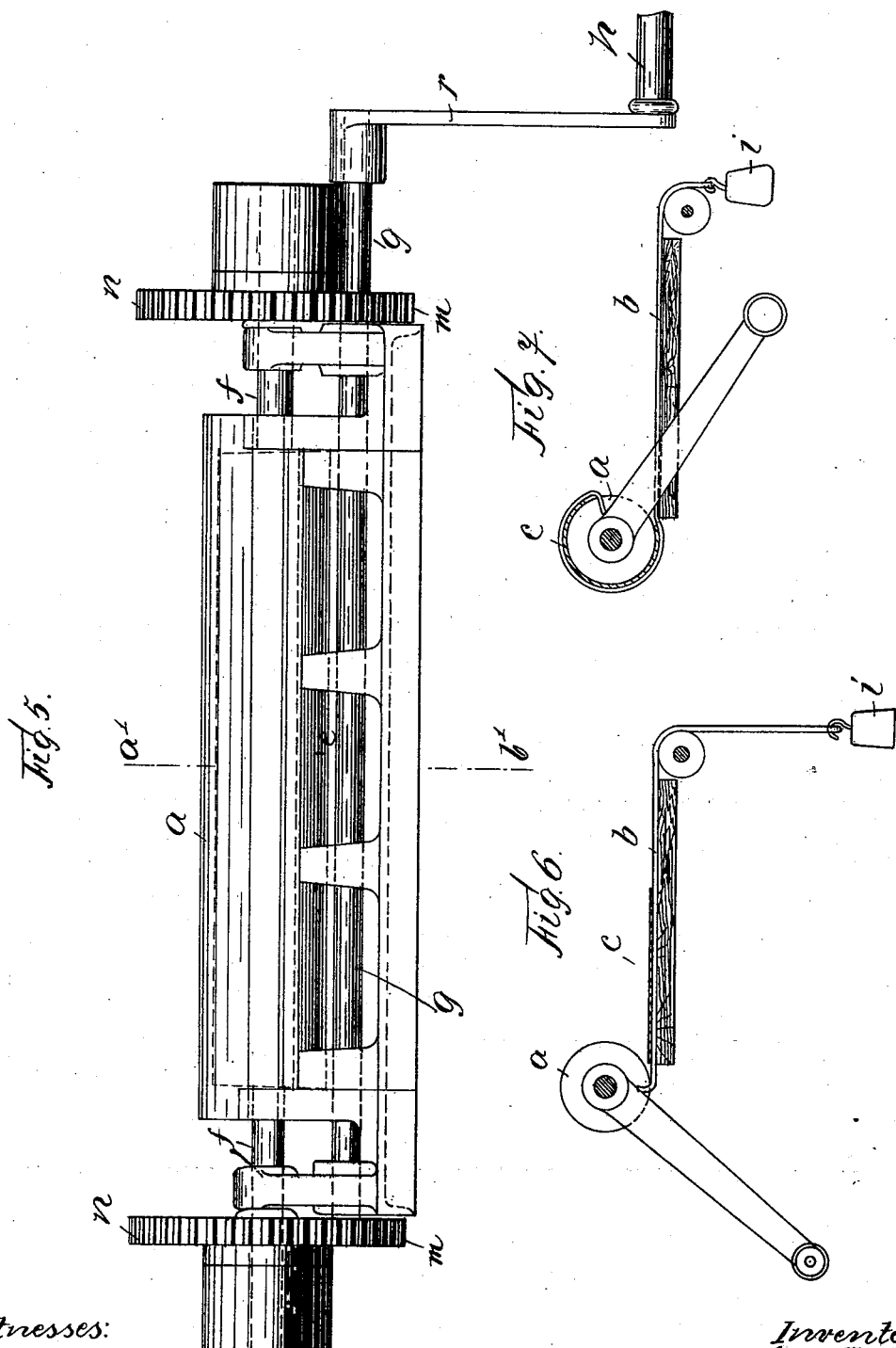

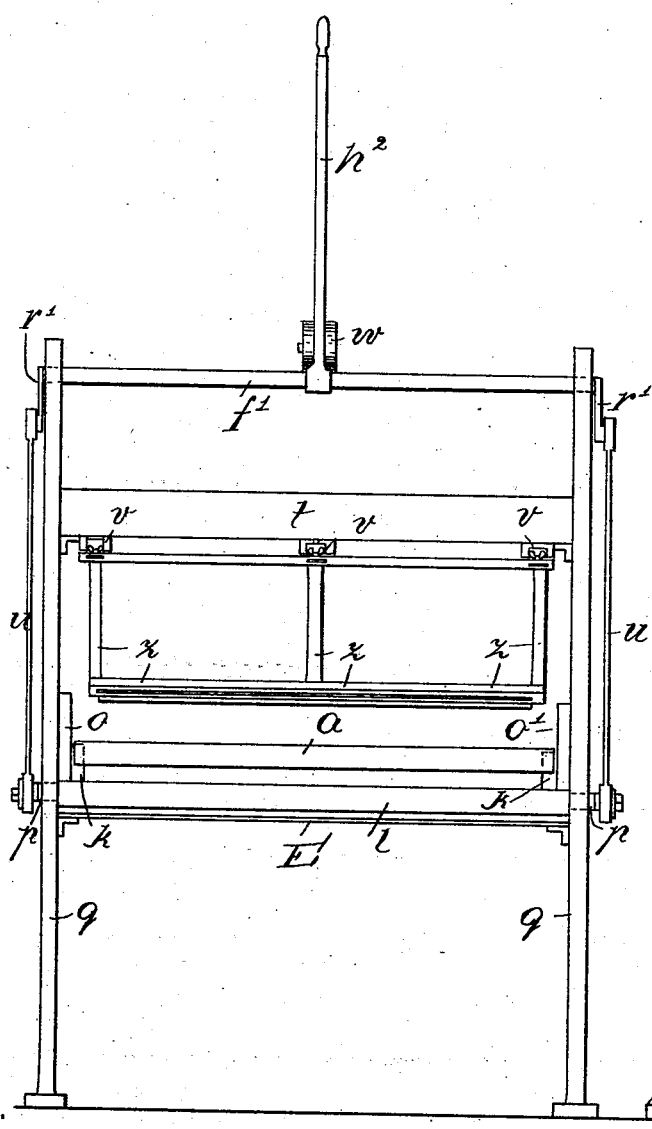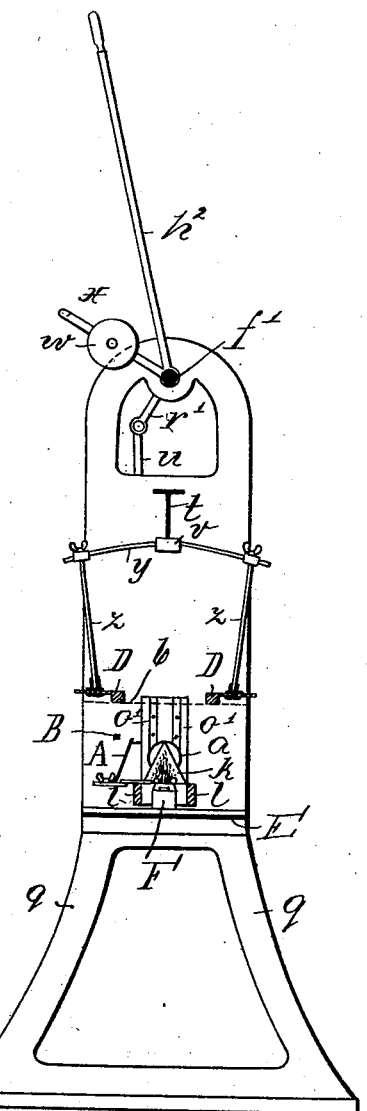

(No Model.) 5 Sheets—Sheet 4.
F. FRIEDRICHS & A. BREDE.
MACHINE FOR FORMING BACKS OF BOOKS.
No. 507,115. Patented Oct. 24, 1893.
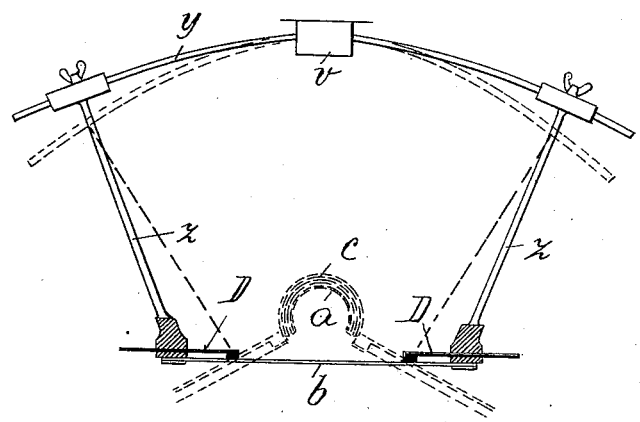
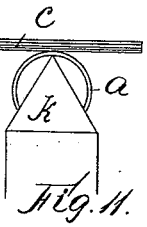
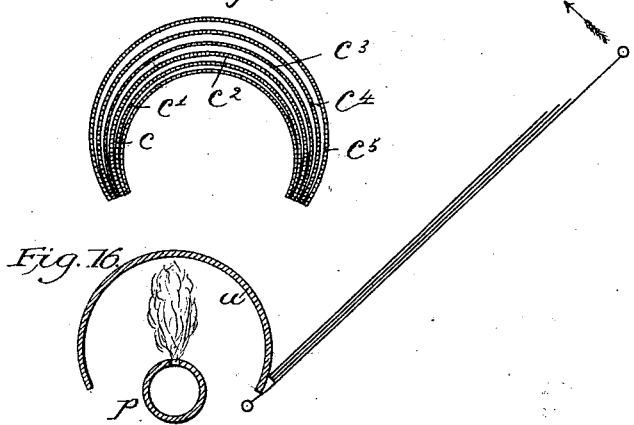
Witnesses.
E. Kayser
Willy Huth.
Inventors.
Frank Friedrichs
Alexander Brede.
by
Robert Dirnle
Attorney.

(No Model.) 5 Sheets—Sheet 5.

F. FRIEDRICHS & A. BREDE.
MACHINE FOR FORMING BACKS OF BOOKS.

No. 507,115. Patented Oct. 24, 1893.

Witnesses:
E. Kayser
Willy Huth

Inventors.
Franz Friedrichs
Alexander Brede.
by:
Robert Winter
Attorney.

UNITED STATES PATENT OFFICE.

FRANZ FRIEDRICHS AND ALEXANDER BREDE, OF COLOGNE, GERMANY.

MACHINE FOR FORMING BACKS OF BOOKS.

SPECIFICATION forming part of Letters Patent No. 507,115, dated October 24, 1893.

Application filed October 26, 1892. Serial No. 450,009. (No model.) Patented in Germany February 5, 1891, No. 59,470, and September 20, 1891, No. 62,713.

*To all whom it may concern:*

Be it known that we, FRANZ FRIEDRICHS and ALEXANDER BREDE, subjects of the King of Prussia, German Emperor, and residents of Cologne, in the Province of the Rhine, Kingdom of Prussia, Empire of Germany, have invented certain new and useful Improvements in Machines for and Methods of Forming the Backs of Books, (for which patents have been obtained in Germany, No. 59,470, dated February 5, 1891, granted to Theodor Beckers, and No. 62,713, (additional patent,) dated September 20, 1891, granted to the firm of Gebrüder Friedrichs,) of which the following is a full, clear, and exact specification.

Our invention relates to a new method and machine for the manufacture of backs for books, and consists in making the back of several sheets or boards of a suitable material glued together only at their longitudinal edges, and in bending this back while applying heat and pressure, the object being to easily manufacture elastic and durable backs for books of varying sizes.

The invention will be more fully disclosed in the following description with reference to the accompanying drawings, and the features of novelty pointed out in the claims.

Figure 12:
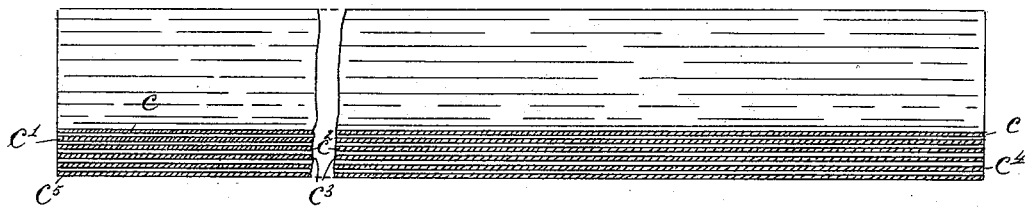
Figure 13:
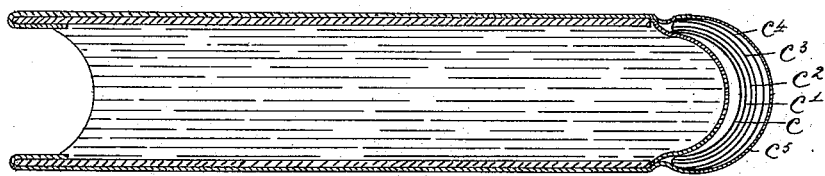
Figure 14:
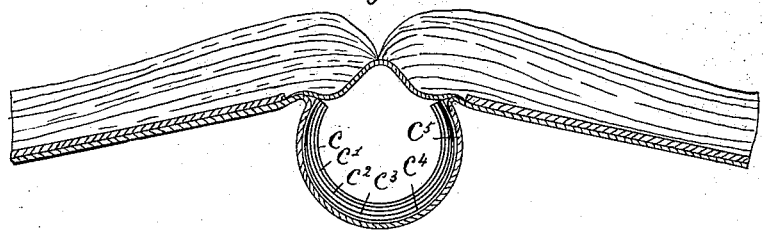
Figure 15:
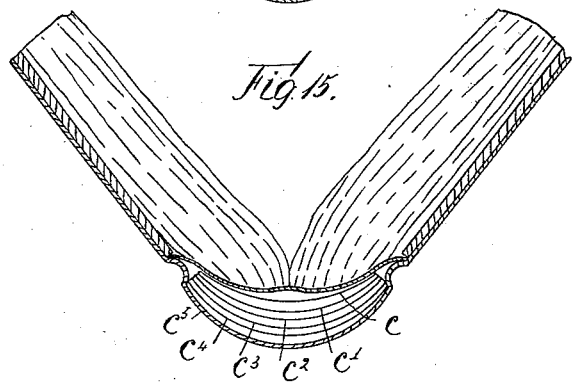

Figure 1, Sheet 1, is a side elevation of our improved machine; Fig. 2 a cross-sectional elevation of the same taken on the line $a'$—$b'$ of Fig. 5. Figs. 3 and 4 illustrate the process of forming the back. Fig. 5, Sheet 2, is a front elevation of the machine. Figs. 6 and 7 are two cross-sectional elevations of a modification. Fig. 8, Sheet 3, is a front elevation of a modified machine; Fig. 9 a side elevation of the same. Fig. 10, Sheet 4, represents the middle part of Fig. 9, drawn to an enlarged scale. Fig. 11 is a cross-sectional view of the improved back manufactured with our machine. Fig. 12, Sheet 5, is a longitudinal sectional view of the same. Fig. 13 shows a book provided with our improved back, closed. Figs. 14 and 15 represent the same fully and half-opened. Fig. 16 shows a part of our improved machine.

Similar letters refer to similar parts throughout the several views.

The machine illustrated by Figs. 1, 2 and 5 consists essentially of a cylindrical tube $a$, which is exchangeable for the purpose of manufacturing backs of various breadths. Suitable means are provided for heating the tube $a$. For instance the tube may be open on its lower side, as shown, and a series of burners placed under the same so that their flames pass through the opening into the interior of the tube $a$ or a gas-pipe $p$ may be arranged within the tube $a$, as shown in Fig. 16. A suitable fabric $b$ of metal or any other resisting material is secured with one of its ends near the circumference of the tube $a$ at the lower part of the same, and with its other end to the periphery of a roller $e$. The sheet $b$ is kept in a state of strong tension by means of a spring $s$ or of a weight. The roller $e$ is secured to an arm $d$, pivoted at $f$. To the pivot of this arm $d$ there are also fixed two toothed wheels $n$, engaging with two similar smaller wheels $m$ on the shaft $g$. The latter may be rotated by means of the crank $r$ and handle $h$.

The operation of the machine is as follows: A number of sheets or strips of paste-board or a similar material are daubed with glue at their longitudinal edges and then placed upon the fabric $b$ with one of their longitudinal edges close to the tube $a$. In Figs. 3 and 4 we have shown three sheets of paste-board $c$ $c'$ $c^2$, and the pieces are preferably of unequal breadth (Fig. 3), so that the edges of the three layers will be flush with one another after being bent, as shown in Fig. 4. The bending of the sheets of paste-board is effected by turning the crank $r$ by means of the handle $h$, so that the toothed wheels $n$ are rotated and the roller $e$ swung around its pivot $f$. The sheets of paste-board are thereby forcibly pressed against the heated tube $a$ by the fabric $b$, and bent into the requisite shape as shown at Fig. 4. The back thus formed is allowed to remain in this position for a certain time, so that the glue may get dry. It will be noticed that the layers of paste-board are united only at their longitudinal edges.

It will be obvious that instead of employing a stationary tube $a$ and rolling the fabric $b$ on the same, the tube $a$ may be rotated and the fabric $b$ be wound on the same automatically in consequence of this rotation. Such a modification is indicated at Figs. 6 and 7, where the tube $a$ may be rotated by means of the crank $r'$ and handle $h'$, whereby the fabric $b$, which is kept stretched by a weight $i$, is wound on the tube $a$ and presses the paste-board $c$ against the same. Thus the back is formed in substantially the same manner as before described.

In Figs. 8 to 10 we have shown a machine in which the desired effect is obtained by moving the tube $a$ in a vertical direction against the fabric $b$, which in this case is stretched out horizontally. The construction is as follows: The tube $a$, which is slotted lengthwise on its lower side, rests with its ends on two small triangular supports $k\ k$, which are joined by the flat iron bars $l\ l$. Vertical guides $o\ o'\ o'$ are provided on the sides of the ends of the bars $l$. The supports $k\ k$ are each provided with a pin $p$ projecting through suitable slots in the standards $q$ and linked to the cranks $r'$ by means of the connecting-rods $u$. The cranks $r'$ are secured to a shaft $f'$ which may be turned by means of the handle $h^2$. To the latter there is also connected a lever $x$ on which a weight $w$ may be displaced. To the standards $q$ there is secured a horizontal bar $t$ of H-iron, and to the lower side of this bar three brackets $v$ are fixed, through which the elastic bows $y$ are passed. From the ends of these bows $y$ there depend two frames $z$, to the lower edges of which the fabric $b$ is secured or clamped so as to lie horizontal. It will be obvious that the elastic bows $y$ will keep the fabric $b$ stretched. A is a rest secured to the supports $k$ which a spring (not shown in the drawings) constantly tends to bring into the position shown in Fig. 9. B is a stop adapted to collide with the rest A when the same rises with the supports $k$. The rest A is adjustable according to the breadth of the pieces of paste-board to be bent, and the breadth of the operative portion of the fabric $b$ may likewise be adjusted by altering the position of the horizontal plates D, which are guided in the lower part of the frames $z$. A table E is also secured to the standards $q$, and a burner F is placed on the table below the opening of the tube $a$.

The operation of the machine is as follows: The rest A and the plates D are adjusted so as to correspond to the breadth of the pieces of paste-board to be bent on the tube $a$, and the latter is heated by means of the burner F. Hereafter the strips of paste-board $c\ c'\ c^2$ are daubed with glue on their longitudinal edges and placed centrally on the top of the tube $a$, so that one of the longitudinal edges is supported directly by the rest A, whereas the other is not supported. Thereupon the handle $h^2$ is turned so as to raise the cranks $r'$ and the tube $a$ with its supports $k$. As soon as the uppermost of the paste-board strips $c$ comes in contact with the fabric $b$, the rest A strikes against the stop B so that it does not impede the said strips in being bent subsequently. As the tube $a$ continues to rise, the fabric $b$ is pressed upward, the lower ends of the frames $z$ are drawn nearer to one another, and the bows $y$ bent, as indicated by dotted lines in Fig. 10. Thus the strips of paste-board are gradually bent till they are pressed closely on the circumference of the heated tube $a$. Finally the plates strike against this tube, and thus the upward movement of the tube is stopped; the pressure exerted on handle $h^2$ will only contribute to force the paste-board more forcibly on the tube $a$. It is preferable to leave the back thus formed exposed for a certain time to the pressure of the fabric $b$ and to the heat of the tube $a$. For this purpose we have provided the weight $w$ which will keep the tube $a$ in its elevated position with a force adjustable by shifting the said weight from or toward the shaft $f'$. When the pressure has lasted for a sufficient time, the handle $h^2$ is turned back and the finished back removed from the machine.

It will be obvious that instead of moving the tube $a$, on which the back is formed, upward and downward the tube may be stationary and the pressing fabric $b$ moved in the opposite direction; other mechanisms, such as a screw, may be used for effecting the required motion; the burner F serving to heat the tube $a$ may be moved together with the same; the strip of paste board, instead of being placed on the tube $a$, may be hung to the under side of the fabric $b$; the tension of the latter may be obtained by means of helical springs, weights, &c.; and other similar modifications may be made without departing from the nature of our invention. It will be further obvious that the same machine may be employed for forming backs consisting of one layer of pasteboard only, or of several layers glued entirely together.

The structure and operation of the backs produced on our improved machine will be seen at Figs. 11 to 15. The back represented in these figures consists of six superposed layers of pasteboard $c\ c'\ c^2\ c^3\ c^4\ c^5$ which are glued together only at their longitudinal edges, as described. These backs present the advantage of being highly elastic, though made of a material which is not elastic by itself. This is due to the fact that the individual layers are free to assume different curvatures.

Our improved elastic backs are considerably cheaper than those made of a material of superior elasticity, such as metal or leather; metallic backs are moreover disadvantageous on account of their hardness, and will rapidly destroy the fabric or leather connecting the back to the covers of the book.

When the book is closed (Fig. 13) the several layers of paste-board are bent about in a semicircle and not subjected to any notable tension. When opening the book the back gradually assumes a curvature of greater radius, so that the inner layers are subjected to a strong tension. At the same time the layers approach each other in consequence of the weight of the book, which presses them down.

It will be seen by a glance at Fig. 14 that the open book has no tendency to close spontaneously, but the elasticity of the back will aid to close the book as soon as the position shown in Fig. 15 is reached. The book is not injured by being closed rapidly, and may be readily opened at any place.

What we claim as our invention, and desire to secure by Letters Patent of the United States, is—

1. A machine for forming backs for books, consisting essentially of a form, means for heating the same, a sheet of a resistant fabric, and means for swinging the fabric around the form in such a manner, that the fabric is gradually pressed around the latter, for the purpose set forth.

2. A machine for forming backs for books, consisting essentially of the stationary form $a$, means for heating the same, the sheet $b$ made of a resistant fabric, a roller $e$ to which the fabric is secured, means for keeping the fabric stretched, the lever $d$ pivoted at $f$ and carrying the roller $e$, the toothed wheels $m$ secured to the shaft $g$, the toothed wheels $n$ and means for rotating the same, all substantially as described.

3. A machine for forming backs for books, consisting essentially of the stationary form $a$, means for heating the same, the sheet $b$ made of a resistant fabric, a roller $e$ to which the fabric is secured, a spring for keeping the fabric stretched, the lever $d$ pivoted at $f$ and carrying the roller $e$, the toothed wheels $m$ secured to the shaft $g$, the toothed wheels $n$ and means for rotating the same, all substantially as described.

In testimony whereof we have signed this specification in the presence of two subscribing witnesses.

FRANZ FRIEDRICHS.
ALEXANDER BREDE.

Witnesses:
FRITZ SCHROEDER,
SOPHIE NAGEL.